United States Patent [19]

Lipfert

[11] 3,717,478
[45] Feb. 20, 1973

[54] DISPOSABLE COOK-IN PACKAGE FOR FROZEN FOOD PRODUCTS

[75] Inventor: Donald E. Lipfert, Woolwich, Maine

[73] Assignee: General Foods Corporation, White Plains, N.Y.

[22] Filed: Sept. 22, 1967

[21] Appl. No.: 669,749

[52] U.S. Cl. ............................99/192 R, 99/171 H
[51] Int. Cl. .....................................................B65b
[58] Field of Search....99/171, 172, 174, 192, 171 H, 99/171 CP, 171 R, 171 PP, 171 CH, 1; 220/13, 14, 15; 229/3.5, 15, 13

[56] References Cited

UNITED STATES PATENTS

| 3,667,667 | 6/1972 | Frankenberg | 99/171 H |
|---|---|---|---|
| 3,465,873 | 9/1969 | Munz | 99/171 H |
| 1,003,112 | 9/1911 | Johnson | 220/13 |
| 1,693,841 | 12/1928 | Gaylord | 99/171 |
| 1,881,873 | 10/1932 | Newcomb | 99/171 X |
| 2,304,373 | 12/1942 | Palmer | 229/23 X |
| 2,618,937 | 11/1952 | Francis | 62/91.5 |
| 2,633,284 | 3/1953 | Moffett et al | 229/3.5 |
| 2,850,391 | 9/1958 | Gunsberg | 99/172 |
| 2,850,392 | 9/1958 | Gunsberg | 99/171 H |
| 2,990,096 | 6/1961 | Crosby | 229/15 |
| 3,012,895 | 12/1961 | Stelnicki | 99/192 |
| 3,069,043 | 12/1962 | Bishop | 220/13 |
| 2,673,003 | 3/1954 | Stewart | 99/171 H |

Primary Examiner—Norman Yudkoff
Assistant Examiner—Hiram H. Bernstein
Attorney—Le Fever, Quillinan & Hubbard

[57] ABSTRACT

A frozen food package acts as a cooking container as well as a serving dish for the contained product and has special application to food products a constituent portion of which is packaged in a dehydrated or concentrated form. The package comprises an inner food receptacle nesting within an outer ice-containing receptacle, the edges of both receptacles being joined in a common seam and covered by a single lid having a snap-fit engagement with said seam. The inner food-containing receptacle is vented at a location above the level of the food product to allow escape of steam generated by heating of the ice and resulting boiling of the water contained in the outer receptacle. The steam, by being directed into the inner food receptacle, hastens the heating of the food product to the desired temperature, and the resultant steam condensate serves to rehydrate or liquefy the hydratable constituent of the product to the desired viscosity. The amount of ice provided in the outer receptacle is predetermined so that upon complete evaporation thereof the food product will be hydrated or reconstituted to the desired temperature and viscosity conditions. Removal of the snap-fit snap-fit lid permits the package to be used as a serving dish.

16 Claims, 8 Drawing Figures

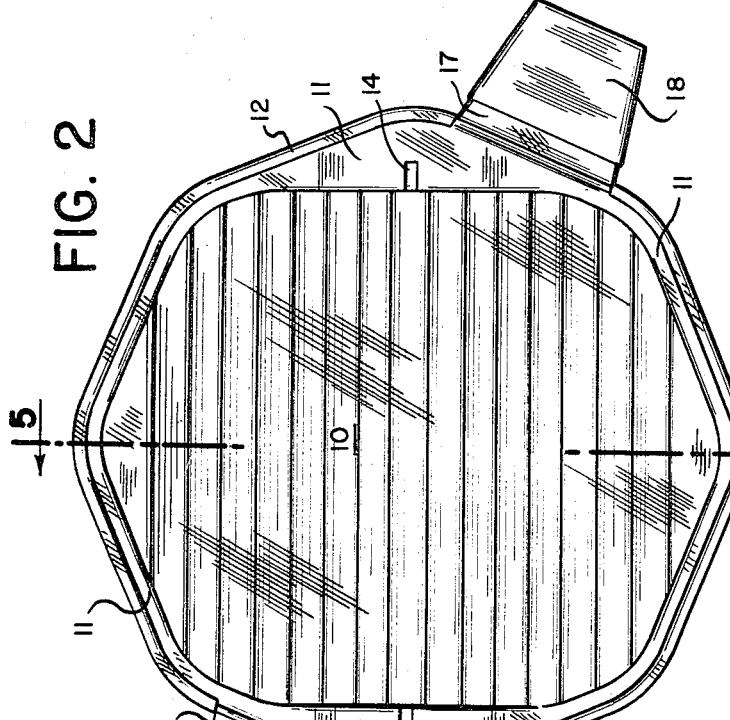
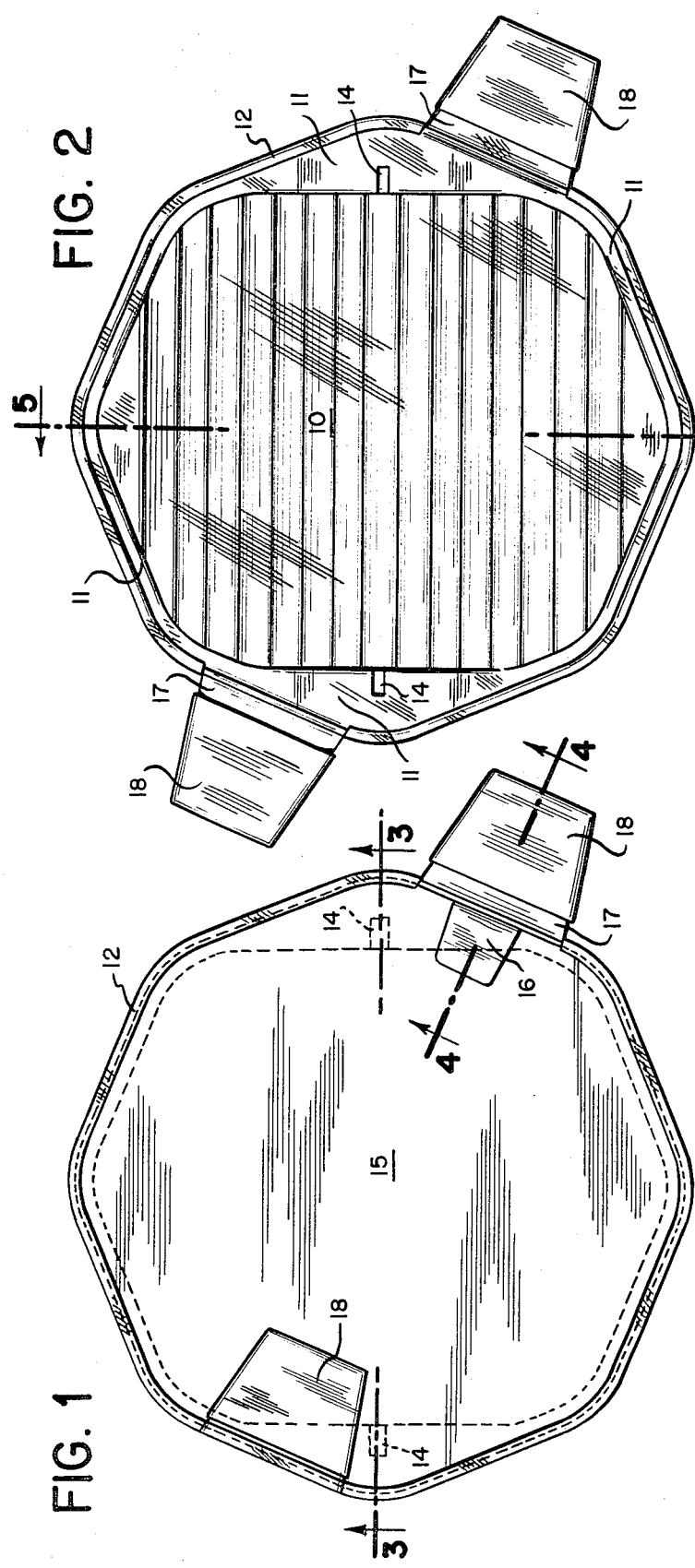
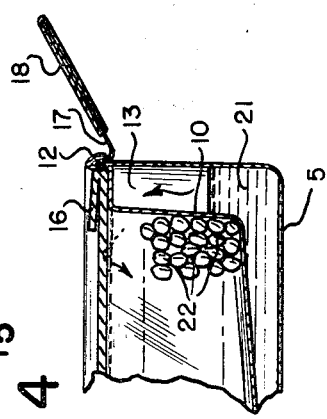
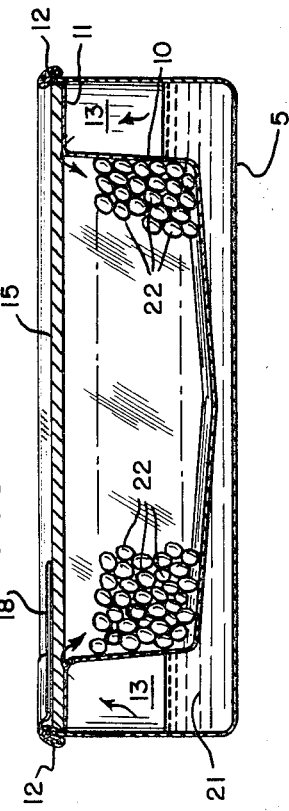
INVENTOR
DONALD E. LIPFERT
BY LeFever Quillinan & Hubbard
ATTORNEYS

PATENTED FEB 20 1973 3,717,478

INVENTOR
DONALD E. LIPFERT

ATTORNEYS

DISPOSABLE COOK-IN PACKAGE FOR FROZEN FOOD PRODUCTS

BACKGROUND OF THE INVENTION

This invention relates generally to the convenience packaging of food products of the sort which are normally consumed in a heated condition and more particularly to a package which adequately protects the contained product during shipment and storage prior to consumption of the contents, which may serve as a cooking vessel in which the contained product is heated to an edible condition, and which may thereafter be used as a serving dish for the contained product, said package at the same time being disposable due to the relatively inexpensive materials employed in the construction thereof. The invention is particularly adapted for use with food products of which a constituent part is a sauce or other liquid ingredient for enhancing the flavoring or textural characteristics of the main component of the product, said products not lending themselves readily to heating by conventional methods or cook-in packages.

The invention is disclosed herein in embodiments utilized as means for packaging frozen uncooked peas combined with a butter sauce, but it should be understood that the advantages of the invention would apply equally well to many other types of food products having sauce constituents. Nor need the invention be limited to a vegetable food product but might equally as well be employed in conjunction with an entree form of product, such as beef stroganoff, or with a pasta-type product which is frequently combined with a cheese or tomato sauce. Of course, the normal and most efficient method of heating products of this type, except for the sauce ingredient, is by immersing the product in boiling water. However, by virtue of the sauce component, this method is not feasible with products of this type, since unless the product were served along with the water in which it was boiled, the sauce would be removed therefrom, and if so served, the sauce would be excessively diluted from its intended state of viscosity. Steaming of such a product in a conventional steamer would not be feasible since in this method the sauce ingredient would also be separated from the major component of the product. Heating such a product in a conventional double boiler-type of vessel has the disadvantage that bringing the product temperature to the desired level would require an excessive amount of time.

The present invention overcomes the disadvantages of the foregoing cooking methods by providing a package for the food product which is in the form of a double boiler with the exception that the inner food-containing receptacle of the structure is formed to permit introduction of steam from the outer water-containing receptacle, a lid being provided over both receptacles to retain the steam within the package and within the inner receptacle in particular. The steam, upon entering the inner food-containing receptacle and in giving up its heat to the food product therein, condenses, and the condensate is retained within the inner food-containing receptacle and serves to liquefy or rehydrate the sauce portion of the product which is initially packaged in a concentrated or dehydrated condition.

According to one embodiment of the invention, water (in the form of ice) is packaged with the product and disposed in the outer receptacle of the package. The amount of water thus packaged is pre-determined so as to be just sufficient, upon complete evaporation thereof, to heat the product to the desired temperature level while at the same time diluting or rehydrating the sauce portion of the product to the desired consistency. By this means, the possibility of overheating the product is substantially eliminated since when the predetermined amount of water is completely evaporated, heating of the product, even though left on a burner, will be substantially reduced since the space between the inner and outer receptacles will provide an insulating area between the food product and the source of heat.

According to another embodiment of the invention, water is not packaged with the product, but the package is designed to permit addition of water to the outer receptacle up to a predetermined amount by the user of the package before commencing to cook the product. With this latter embodiment of the invention, means are provided to prevent the addition of more than a predetermined amount of water, thus again assuring that the possibility of overheating the product will be substantially avoided.

The prior art includes various forms of food packages intended to serve as disposable cook-in containers, but none of the prior art packages known to applicants in this field includes the particular combination of features embraced by this invention which renders the package particularly suited for rapidly heating a food product having a sauce or similar viscous ingredient as a constituent part thereof. For example, United States patents to Gunsberg, U.S. Pat. Nos. 2,850,391 and 2,850,392, disclose a cook-in container for a frozen food product, but in each instance the container is of such a character as to heat the contained product by a steaming process, the bottom of the food compartment of the package in each instance being perforated and thus rendering the package unsuitable for food products having a sauce component since the sauce would necessarily be drained from the product during the cooking process. The United States patent to Bishop, U.S. Pat. No. 3,069,043, discloses a food package serving as a cook-in container wherein the structural configuration of the container renders it in essence a double boiler, it being noted that the lid of this package must first be removed, in order to introduce water into the outer receptacle, before the package may be placed over a heat source. A double boiler structure is not the most efficient means for heating a frozen food product, due to the excessively long time required to bring the product to the desired temperature, particularly where the product is not of a liquid nature but, as in the instant case, mainly a product consisting of solids and including a sauce as only a minor portion thereof.

SUMMARY OF THE INVENTION

The present invention overcomes the deficiencies of the prior art structures with respect to food products of the type hereinabove mentioned in that means are provided for venting the steam generated by heating of the water in the outer receptacle into the inner receptacle so that when the lid of the container is maintained in place, the steam saturates the contained food product to achieve rapid heating thereof without loss or draining away of the sauce portion of the food product. The particular configuration of the package is one which lends itself to fabrication out of relatively lightweight metal foil materials, the configuration of the inner and outer receptacles not being in precise conformance with one another so as to provide expansion chambers in the area of the steam vents which serve to release the bubbles of gas vapor formed incident to the boiling of the water in the outer receptacle and to prevent spouting of the heated or boiling water directly through the steam vents into the inner product-containing receptacle.

It is therefore an object of the present invention to provide an improved disposable cook-in container for a frozen food product.

It is a further object of the invention to provide an improved disposable cook-in container package for a frozen food product combined with a sauce or sauce-like component.

It is a still further object of the invention to provide a disposable cook-in package for a frozen food product which is durable in construction, efficient in operation, and inexpensive to manufacture.

Further objects of the invention together with the features contributing thereto and the advantages accruing therefrom will be apparent from the following description when read in conjunction with the accompanying drawing.

BRIEF DESCRIPTION OF THE DRAWING

FIG. 1 is a plan view of a disposable food package according to the present invention;

FIG. 2 is a plan view of the package with the lid and food product removed therefrom;

FIG. 3 is an elevational view in section taken along the line 3—3 of FIG. 1;

FIG. 4 is a fragmentary elevational view in section taken along the line 4—4 of FIG. 1;

Figure 5:
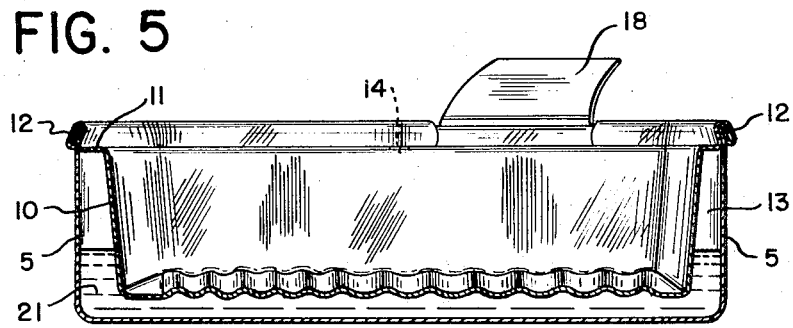
FIG. 5 is a sectional view in elevation of the package taken along the line 5—5 of FIG. 2.

Referring now to the drawing, it will be seen that the package according to the instant invention includes an outer receptacle 5 in the form of a pan and preferably having an octagonal shape for reasons hereinafter to be described. The receptacle 5 may be formed out of a sheet of metal foil, preferably steel foil, it being found that steel foil having a thickness of approximately 2 mils has proved satisfactory for this purpose. In order to form an octagonal receptacle, the sheet of steel foil would first be cut into the shape of an octagonal blank and then the marginal areas of the blank would be bent upwardly to form the eight side walls of the receptacle. The excess metal foil material produced at each of the eight corners of the receptacle as a result of folding up the marginal portions of the blank are flattened out against the side walls on opposite sides of each corner to result in what may be referred to as pleats 6 which, in effect, provide each corner area of the receptacle with a triple ply thickness, thus reinforcing each of the eight corners and contributing greatly to the strength and structural rigidity of the receptacle and enabling it to be fabricated from a lighter weight metal foil than otherwise would be the case. The formation of the outer receptacle 5 in an octagonal shape also makes possible the use of lighter weight metal foil materials than if the receptacle were to have a fewer number of sides, such as, for example, if it were a rectangular receptacle, since in the case of containers having equivalent interior volume, the one having the greater number of sides means that each side extending between the reinforced corners will be shorter, thereby contributing to the structural rigidity of the receptacle.

Nested within the outer receptacle 5 is an inner receptacle 10 in the form of a pan, also preferably made of a metal foil material, and conforming in part to the shape of the outer receptacle 5. The metal foil from which the inner receptacle 10 is made can be of lesser rigidity than that of the outer receptacle and it has been found that an aluminum foil of approximately 3 mil thickness has proven quite satisfactory for this purpose. The inner receptacle is also formed from a blank of metal foil material cut in an octagonal shape, the marginal portions of the blank being turned upwardly to form the side walls of the inner receptacle and the extreme marginal portions of the blank being then bent outwardly to provide a peripheral shelf 11, the outer edge of which is disposed adjacent the edge of the outer receptacle 5, the two adjacent edges being joined together in a rolled joint seam 12 which effectively supports the inner receptacle 10 within the outer receptacle 5 and in spaced relation thereto. In forming the side walls of the inner receptacle 10 out of the octagonal blank of aluminum foil material, preferably two opposed angles are omitted in the side wall construction to result in a pan or receptacle construction having four relatively short side walls conforming to and parallel with the side walls of the outer receptacle 10 and two relatively longer side walls not conforming and not parallel to the adjacent side walls of the outer receptacle 5 to thereby provide between the longer side walls of the inner receptacle and the side walls of the outer receptacle enlarged areas serving as vapor-release chambers 13 in the manner to be hereinafter more fully described. Apertures or vents 14 formed in the shelf 11 overlying and partly defining the aforesaid vapor-release chambers permit the escape of heated air or steam from the outer receptacle 5 into the inner receptacle 10. The inner receptacle is enclosed by a cover or lid 15 formed of paperboard or the like which rests on the peripheral shelf 11 of the inner receptacle, said cover having a snap-fit attachment to the rolled joint seam 12, which, as can best be seen in FIG. 3, is bent inwardly to form a peripheral undercut serving to seat the edges of the cover or lid 15. The cover 15 is disposed over the vents 14 but not in sufficient sealing contact therewith to prevent the escape of steam from the vapor-release chambers 13 through the vents and between the shelf 11 and cover 15 and into the inner receptacle 10. The under surface of cover 15 is preferably coated with a moisture resistant plastic film to prevent penetration of moisture into the cover during the cooking process. Preferably, the cover 15 is provided with a protrusion in the form of a gripping tab 16 which is normally in folded-over relation to the cover but which may be grasped by the user and utilized to remove the cover from the package after cooking of the contents is completed and the contents are ready for removal therefrom.

The package is also preferably provided with a pair of lifting tabs 17 disposed at opposite sides thereof and also preferably formed of a metal foil material which is an extension of the inner aluminum container which is left to protrude beyond the rolled joint seam 12, aforesaid. Said tabs may be covered with a jacket 18 of heat-insulating material to facilitate handling of the package when in the heated condition. It has been found that heat-insulating material such as vulcanized paper fiber having a thickness in the order of 0.010 inch has proven satisfactory for this purpose. The lifting tabs are normally folded over the cover 15 for shipment and storage of the package, and when preparing for use the tabs may be folded outwardly to the position thereof as shown in FIG. 2 wherein they serve as handles for the package to facilitate the use of the package as a cooking container and subsequently, if desired, as a serving dish.

Figure 6:
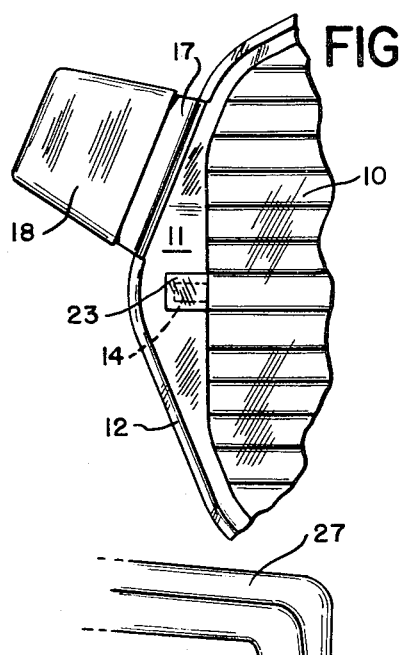
FIG. 6 is a fragmentary view illustrating the operational use of a film of thermo-sensitive material sealing the steam vent portion of the structure.

Packaged within the outer receptacle 5, in accordance with the embodiment of the invention illustrated in FIGS. 1–5, is a pre-determined amount of water 21 which, of course, when the package is maintained in its normal frozen condition, is in the form of ice, and which occupies the space between the bottoms of the respective receptacle 5,10. Packaged within the inner receptacle 10 is the food product to be heated and ultimately consumed by the user, the product illustrated in conjunction with the disclosed embodiment being one such as frozen peas 22, is being understood that in the present instance the product includes a sauce constituent, such as a butter sauce, which is fully interspersed throughout the mass of the product. The water 21 may be added to the outer container before the package is assembled into two receptacles and sealed together or, if desired, it may be added to the outer container after assembly of the package and introduced into the outer receptacle through the vents 14. As a precautionary measure, to prevent the escape of the water 21 through the vents 14 in the event that the package should become unfrozen through accident or inadvertence any time during shipping and storing and prior to its use by the consumer, the vents may be sealed by a film 23 or other suitable form of hot-water-soluble or heat-shrinkable and cold-water-resistant material such as is indicated in the fragmentary view of FIG. 6. Such a material could be methyl cellulose, oriented polypropylene, or the like and would serve to retain the water within the outer receptacle and prevent its leakage into the inner receptacle 10 in the event of premature melting of the frozen water or ice 21 prior to use by the consumer. The bottom surface of the inner receptacle 10 is preferably corrugated, as is clearly indicated in the sectional view of FIG. 5. The corrugation of this surface gives greater structural rigidity to the receptacle and also provides a more extensive surface for transfer of heat from the water 21 while being heated to the contained product 22 to achieve a more rapid heat transfer than would be the case if the bottom surface were not corrugated.

In use, the package according to the invention in the embodiment illustrated in FIGs. 1–5 may be transferred directly from a frozen storage compartment and placed on a stove or other heat source. Heat applied to the bottom surface of the outer receptacle 5 quickly melts the ice 21 and eventually brings it to a boiling condition. The steam generated by the heating and boiling of the water escapes through the vents 14, after first causing said vents to become unsealed in instances where a film 23 of hot-water-sensitive material is utilized, as aforementioned, this steam thus becoming interspersed with the product 22 and serving as a further means for heating of the product 22. The product, of course, is also heated by heat transferred by conduction through the bottom and side surfaces of the inner receptacle 10. The steam, when coming into contact with the frozen product, condenses, and the condensate acts to liquefy the concentrated sauce constituent of the product. By providing a pre-determined amount of water 21 in the package, the amount of heat transferred to the product and the amount of steam condensate which will act to liquefy the product can be quite closely controlled. The predetermined amount of water is a quantity such that when fully evaporated, the amount of heat transferred will be just sufficient to bring the product to its desired temperature and also just sufficient to liquefy the sauce constituent to it desired consistency. Overheating of the product is substantially avoided since once the water 21 is completely evaporated, the space between the bottom of the inner receptacle 10 and the bottom of the outer receptacle 5 will contain nothing but air and thus serve as insulation between the product and the heat source.

Due to the relatively close spacing between the side walls of the inner receptacle 10 and the side walls of the outer receptacle 5 along the areas where they conform to one another, the water contained therebetween will likely spout so some extent when in a boiling condition, and unless means are otherwise provided, this spouting water could possibly escape into the inner receptacle 10 if the escape vents were provided at these locations of the package. It is for this reason that the walls of the respective receptacles are shaped to provide the vapor-release chambers 13 and that the vents 14 are located at these areas of the package. The increased spacing between the walls of the respective receptacles at the vapor release chambers enables vapor generated by the boiling of the water to escape without forcing the water upwardly and thereby prevents spouting of the water through the steam-escape vents 14.

After the product is completely heated, the package may be readily removed from the stove or heat source by use of the insulated tabs 17 and employed as a serving dish for the now heated product. Access to the product may be readily gained by removal of the package snap-fit lid 15 by the simple expedient of pulling on the lid tab 16.

Figure 7:
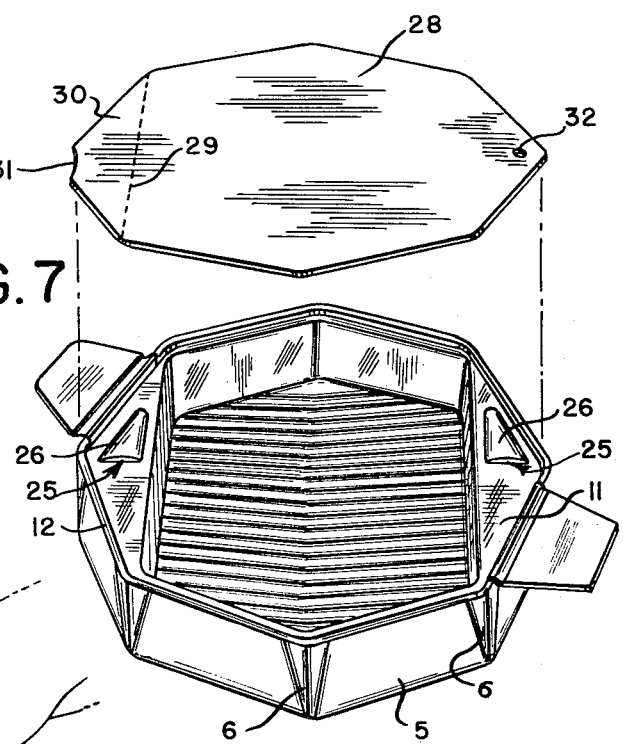
FIG. 7 is a perspective view of a slightly modified embodiment of the package shown in the preceding views.
Figure 8:
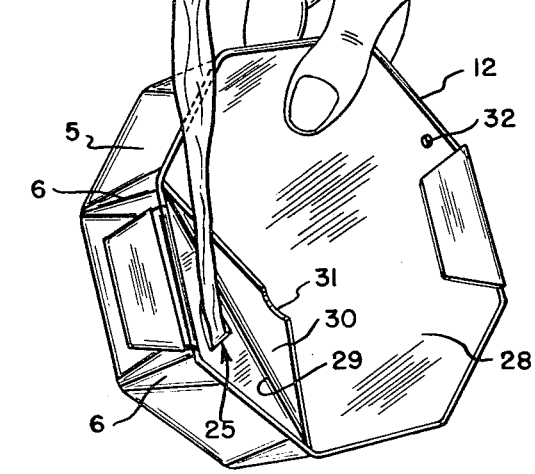
FIG. 8 is an operational view of the package embodiment of FIG. 7 illustrating the manner in which water may be introduced into the outer receptacle of the package.

FIGS. 7 and 8 illustrate a slightly modified form of the invention wherein water is not packaged with the product but, instead, is intended to be added to the package just prior to heating. In this embodiment of the invention, the steam vents 25 formed in the shelf 11 overlying the vapor-release chambers are located adjacent a depression 26 in the shelf. Said depression 26 serves as a channel or spout for directing and facilitating the introduction of water through the vents 25 and into the outer receptacle 10. This operation of introducing water, such as from a spout 27, is operatively illustrated in FIG. 8. In order to gain access to one of the vents 25 for the purpose of introducing water therethrough, the lid 28 of the package according to this embodiment is formed with a score line 29 defining a foldable tab portion 30 of the lid which is formed with a finger grip notch 31 which enables the tab portion 30 to be raised sufficiently, without removing the entire lid from the package, so as to expose one of the vents 25. The lid is also formed near a corner opposite the finger grip notch 31 with a small perforation or vent 32 which is disposed in registration with the other steam vent 25. When the package is held in a tilted position such as shown in FIG. 8 and water is allowed to enter through the vent 25 normally underlying the lift tab portion 30, the water level will continue to rise until it reaches the level of the other vent 25, whereupon any excess water will start to escape through the vent 32 of the lid, thereby indicating to the user that the pre-determined desired amount of water is contained in the package. After having thus been filled with water to the desired extent, the lift tab portion 30 is folded back to its reclosure position and the package is then ready for placement on a stove or other heat source for heating and subsequent serving in the same manner as above described in conjunction with the embodiment of FIGS. 1–5.

Although reference has been made above to the desirability and special adaptability of the package of this invention for use with products having a sauce in condensed form, it will be appreciated that the invention is also adaptable for products not having a sauce component but wherein the addition of a predetermined amount of water to the product itself is desirable, such as would be the case if the product were packaged in at least a partially dehydrated condition.

While there has been herein shown and described what is considered to be preferred embodiments of the invention, it will, of course, be understood that changes in form could obviously be made without departing from the spirit of the invention, and it is therefore intended that the invention be not limited to the exact forms thereof herein shown and described nor to anything less than the whole of the invention as hereinafter claimed.

What is claimed is:

1. A cook-in container for a frozen food product of which at least one ingredient is in a hydratable condition comprising:
   a. an outer receptacle of non-combustible heat-conductive sheet material in the shape of a polygon having at least five sides and adapted to contain a vaporizable cooking agent,
   b. an inner receptacle of continuous sheet material in the shape of a polygon having fewer sides than and nested within said outer receptacle and adapted to contain said food product, said inner receptacle being joined at its edges to the edges of said outer receptacle and formed with an opening disposed above the level of said food product and communicating with said outer receptacle, the sides of said inner receptacle along a major portion of its periphery being uniformly spaced from and parallel to corresponding sides of said outer receptacle and along a minor portion of its periphery including at least one longer side non-parallel and corresponding peripherally to two adjoining sides forming an apex of said outer receptacle to substantially define therewith an enlarged triangular area between said receptacles to constitute a vapor release chamber for said cooking agent, and
   c. a detachable lid formed of moisture resistant sheet material covering said receptacles to completely enclose said food product therein and to provide a vapor barrier therefor, whereby the vapor generated by the heating of said cooking agent, when said package is exposed to a heat source, contributes to the cooking of said product and the condensate of said vapor retained within said inner receptacle by said lid reconstitutes the hydratable ingredient of said product.

2. The invention according to claim 1 wherein said receptacles are formed of metal foil.

3. The invention according to claim 2 wherein said outer receptacle is formed into a shape in horizontal cross section of a regular polygon, each angle of said shape being defined by pleats formed in the respective metal foil material.

4. The invention according to claim 1 wherein said outer receptacle is of octagonal shape in horizontal cross section and said inner receptacle in horizontal cross section is of a hexagonal shape having two longer sides oppositely disposed to provide at opposite sides of said container a said enlarged triangular area between said inner and outer receptacles to serve as a vapor release chamber for said cooking agent, each said opening being formed in a portion of said inner receptacle defining a said chamber.

5. The invention according to claim 4 wherein said opening is sealed by a film of heat-sensitive material.

6. The invention according to claim 4 wherein said lid is foldable along an edge portion to expose one of said openings and is formed with an aperture overlying the other of said openings, whereby said cooking agent may be introduced into said outer receptacle through the exposed opening and will flow out of said outer receptacle through the other of said openings and said aperture upon reaching the level thereof.

7. The invention according to claim 6 wherein said inner receptacle is formed with a depressed area immediately adjacent and communicating with said one opening to facilitate the introduction of said cooking agent through said one opening.

8. The invention according to claim 1 including a cooking agent in the form of ice disposed between the walls of said inner and outer receptacles.

9. A frozen food package adapted to serve as a cook-in container comprising:
   a. an outer receptacle of non-combustible, heat conductive sheet material in the shape of a polygon having at least five sides and adapted to contain a vaporizable cooking agent,
   b. an inner receptacle of continuous sheet material in the shape of a polygon having fewer sides than and nested within said outer receptacle and joined at its edges to the edges of said outer receptacle, said inner receptacle being formed with an opening disposed near its edge and communicating with said outer receptacle, the sides of said inner receptacle along a major portion of its periphery being uniformly spaced from and parallel to corresponding sides of said outer receptacle and along a minor portion of its periphery including at least one longer side nonparallel and corresponding peripherally to two adjoining sides forming an apex of said outer receptacle to substantially define therewith an enlarged triangular area between said receptacles to constitute a vapor release chamber for said cooking agent, c. a frozen food product of which at least one ingredient is in a hydratable condition contained within said inner receptacle, and d. a detachable lid formed of moisture resistant sheet material covering said receptacles to completely enclose said food product therein and to provide a vapor barrier therefor, whereby the vapor generated by the heating of said cooking agent, when said package is exposed to a heat source, contributes to the cooking of said food product and the condensate of said vapor contained within said inner receptacle by said lid reconstitutes the hydratable ingredient of said product.

10. The invention according to claim 9 wherein said receptacles are formed of metal foil.

11. The invention according to claim 10 wherein said outer receptacle is formed into a shape in horizontal cross section of a regular polygon, each angle of said shape being defined by pleats formed in the respective metal foil material.

12. The invention according to claim 9 wherein said outer receptacle is of octagonal shape and said inner receptacle in horizontal cross section is of a hexagonal shape having two longer sides oppositely disposed to provide at opposite sides of said container a said enlarged triangular area between said inner and outer receptacles to serve as a vapor release chamber for said cooking agent, each said opening being formed in a portion of said inner receptacle defining a said chamber.

13. The invention according to claim 9 wherein said opening is sealed by a film of heat-sensitive material.

14. The invention according to claim 12 wherein said lid is foldable along an edge portion to expose one of said openings and is formed with an aperture overlying the other of said openings, whereby said cooking agent may be introduced into said outer receptacle through the exposed opening and will flow out of said outer receptacle through the other of said openings and said aperture upon reaching the level thereof.

15. The invention according to claim 14 wherein said inner receptacle is formed with a depressed area immediately adjacent and communicating with said one opening to facilitate the introduction of said cooking agent through said one opening.

16. The invention according to claim 9 including a cooking agent in the form of ice disposed between the walls of said inner and outer receptacles.

* * * * *